United States Patent [19]

Markley et al.

[11] 4,456,315

[45] Jun. 26, 1984

[54] INDUSTRIAL TERMINAL WITH ELASTIC BUMPERS

[75] Inventors: Theodore J. Markley, Mentor; Daniel J. Galdun, Huntsburg; Charles E. Clark, Eastlake; Robert G. Henderson, Wickliffe; Frank W. Jencen, Cleveland, all of Ohio

[73] Assignee: Allen-Bradley Company, Milwaukee, Wis.

[21] Appl. No.: 330,184

[22] Filed: Dec. 14, 1981

Related U.S. Application Data

[62] Division of Ser. No. 075,175, Sep. 12, 1979.

[51] Int. Cl.³ .......................................... A47B 81/06
[52] U.S. Cl. .................................. 312/137; 312/7.2; 312/111; 220/85 K; 248/345.1
[58] Field of Search ............... 340/365 R, 700, 712, 340/365 VL; D14/106, 107, 100, 101; 358/254; 312/7.2, 137, 111; 52/288; 220/85 K; 190/37; 248/345.1

[56] References Cited

U.S. PATENT DOCUMENTS

D. 244,637  6/1977  Gray ............................... D14/100
D. 255,116  5/1980  MacDonald et al. ............ D14/106
   721,904  3/1903  Martin .................................. 190/37
 1,576,527  3/1926  McBride .............................. 190/37
 2,166,798  7/1939  Cote ................................. 248/345.1
 2,774,502  12/1956 Novak .............................. 220/85 K
 2,885,821  5/1959  Frick ................................ 248/345.1
 3,762,788  10/1973 Heller ................................ 312/111
 4,153,230  5/1979  Giacin ............................. 248/345.1
 4,161,853  7/1979  Weiss et al. ......................... 52/288
 4,172,623  10/1979 Anderson .......................... 312/7.2

FOREIGN PATENT DOCUMENTS 410596  5/1934  United Kingdom ............ 220/85 K

*Primary Examiner*—Victor N. Sakran
*Attorney, Agent, or Firm*—Barry E. Sammons

[57] ABSTRACT

A CRT terminal includes a main unit which houses circuitry and the CRT display. An application module which includes a keyboard plugs into the front of the main unit and electrically connects to its circuitry. A flexible membrane keyboard is employed which includes a keyboard overlay that is easily changed to provide keyboard symbols appropriate to a wide variety of different applications. Resilient bumpers extend completely around the main unit to facilitate its use in industrial applications where physical abuse is common.

3 Claims, 11 Drawing Figures

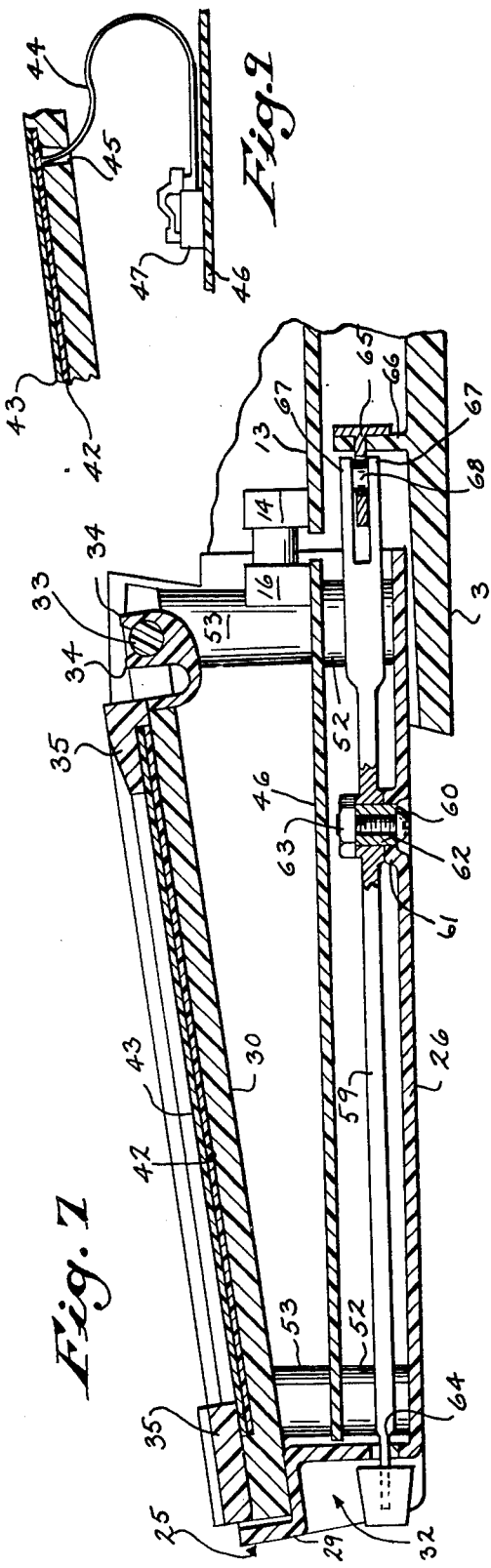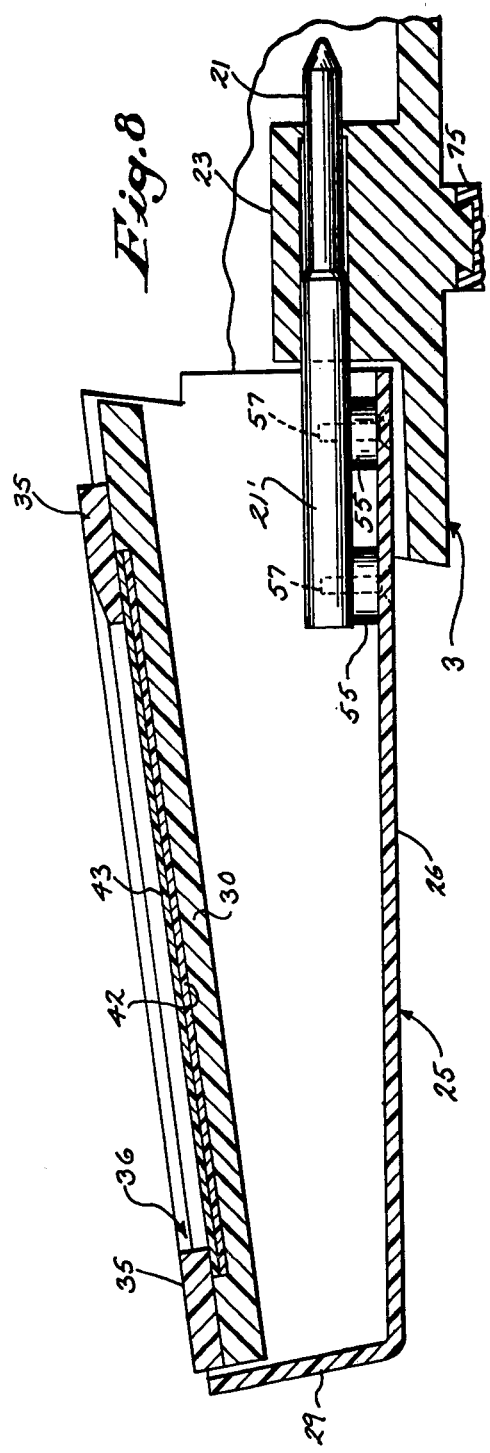

INDUSTRIAL TERMINAL WITH ELASTIC BUMPERS

This is a division of application Ser. No. 075,175, filed Sept. 12, 1979.

BACKGROUND OF THE INVENTION

The field of the invention is computer terminal equipment, and particularly, display terminals suitable for industrial applications.

Computer terminals are commercially available in a wide variety of configurations. The most common configuration includes a cathode ray tube display (CRT) and a keyboard which may either be attached to the display or contained in a separate housing that is electrically connected to the display. Such CRT terminals also include one or more serial communications ports which may be connected to a similar port on another piece of equipment such as a computer, process controller, or programmable controller.

Although the CRT display is very general purpose, the same cannot be said of the keyboard. For many commercial applications a typewriter keyboard is appropriate, but there are many instances in industrial applications where special purpose mnemonics, symbols or fonts are used and in which a standard alphanumeric keyboard becomes awkward. One such application, for example, in the input of control program data into a programmable controller.

Filed on even data herewith is a copending U.S. patent application entitled "Industrial Terminal" in which the circuitry is described for a multi-purpose terminal. Circuitry for driving the CRT display and receiving data at serial I/O ports is provided on a main circuit board. This portion of the circuitry is very general purpose in nature and separate circuitry for "tailoring" the terminal to a specific application is provided on a separate application module. The application module also includes the data entry apparatus peculiar to that application, which in most instances is a keyboard with suitable symbols.

SUMMARY OF THE INVENTION

The present invention relates to a terminal which is suitable for industrial use. The main unit is substantially rectangular in shape and it includes a pair of elastic bumpers which each extend completely around the main unit. The bumpers provide resilient support regardless of the orientation of the terminal when it is set down on a surface and they provide attractive accent lines.

The foregoing and other objects and advantages of the invention will appear from the following description. In the description, reference is made to the accompanying drawings which form a part thereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 7 is a view in cross section taken on the plane 7—7 indicated in FIG. 6, FIG. 8 is a view in cross section taken along the plane 8—8 indicated in FIG. 6, FIG. 9 is a view in cross section taken along the plane 9—9 indicated in FIG. 6, FIG. 10 is a view in cross section taken through a forward bumper which forms part of the terminal of FIG. 1.

DESCRIPTION OF THE PREFERRED EMBODIMENT

Figure 1:
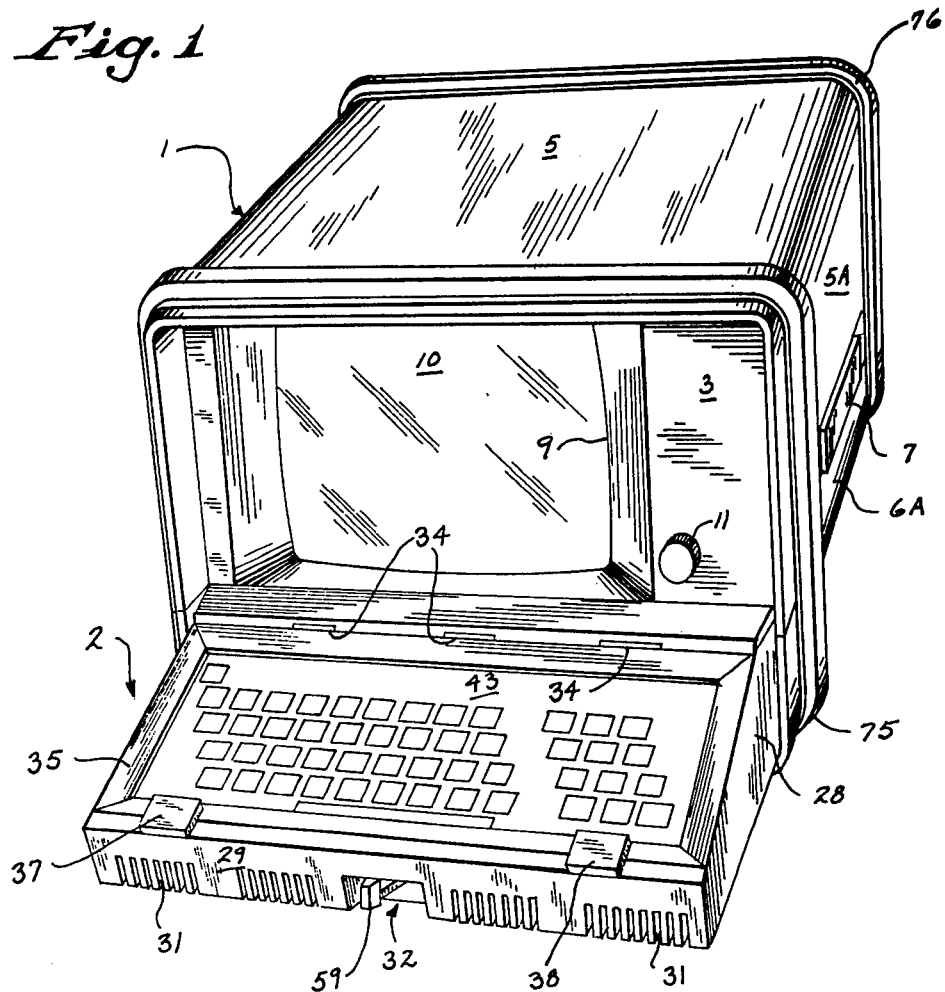
FIG. 1 is a perspective view of the preferred embodiment of the invented terminal.
Figure 2:
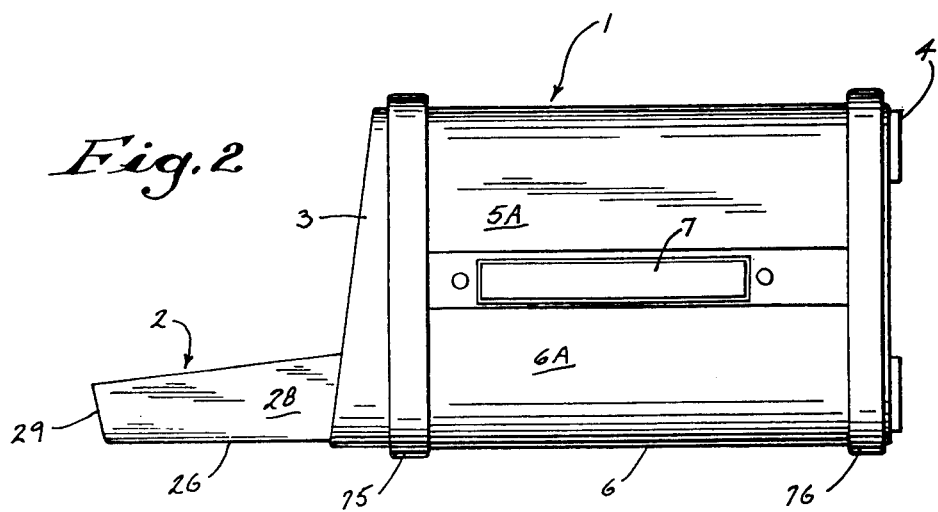
FIG. 2 is a side elevation view of the terminal of FIG. 1.
Figure 3:
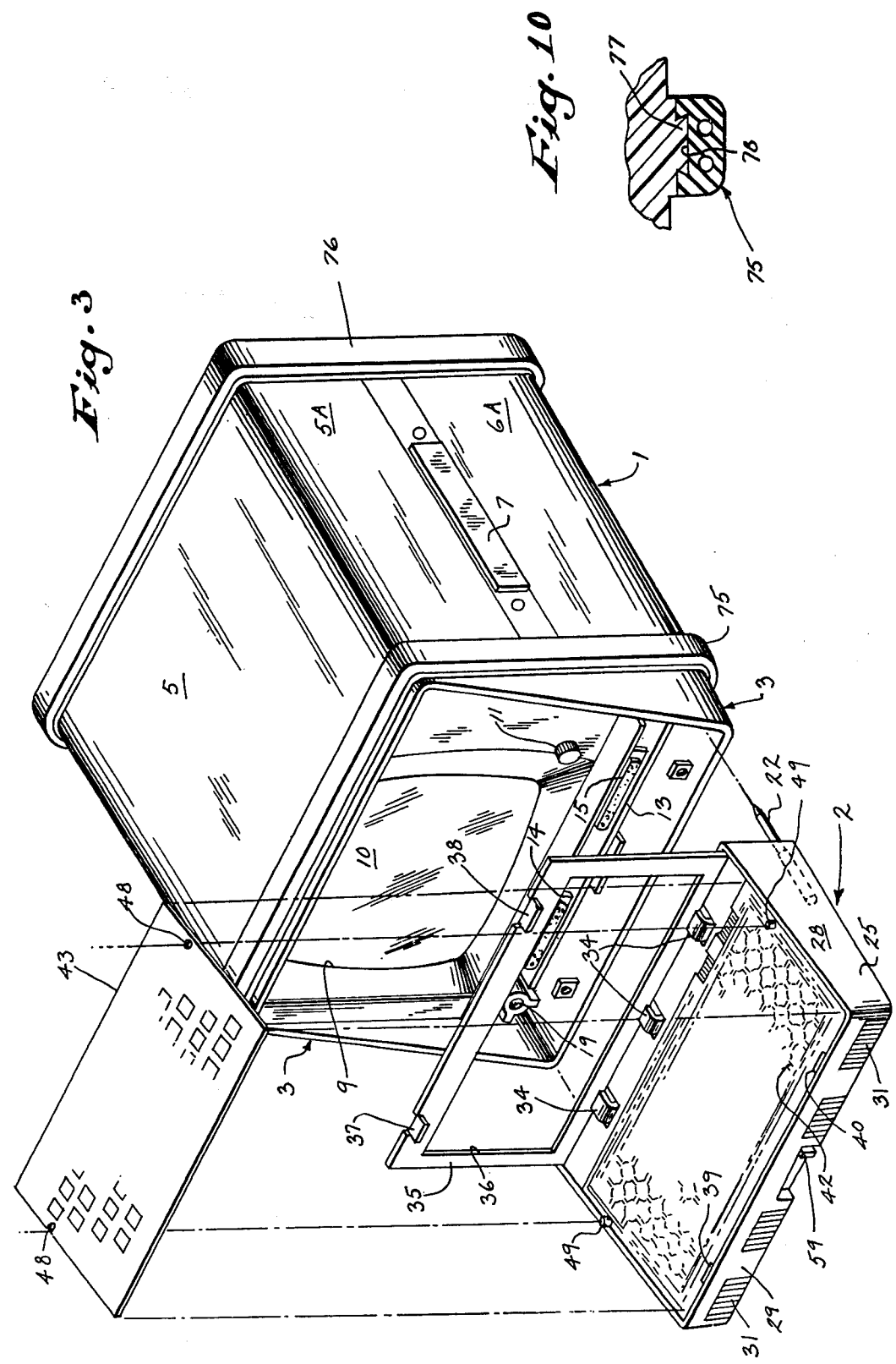
FIG. 3 is an exploded perspective view of the terminal of FIG. 1.

Referring particularly to FIGS. 1-3, the preferred embodiment of the invention is a terminal intended for industrial use which includes a substantially rectangular main unit 1 and an application module 2 which connects to the front of the main unit 1. The main unit 1 is constructed around a wire frame, or chassis (not shown in the drawings) to which a two-part molded plastic bezel 3 and a molded plastic back 4 connect to form the front and back of the main unit 1. A sheet metal top cover 5 fastens to the wire frame to not only enclose the top surface of the main unit 1, but also, the extend downward to form the upper portion 5A of the left and right sides of the main unit 1. Similarly, a sheet metal lower cover 6 encloses a bottom of the main unit 1 and it extends upward along each side to form the lower portion 6A of the left and right sides of the main unit 1. At the juncture of the covers 5 and 6 on the right hand side of the main unit 1 is a handle 7 which is securely fastened to the chassis. The bezel 3, the back 4 and the covers 5 and 6 thus substantially enclose the electronic circuitry in the main unit 1 to protect it from the harsh industrial environment and the handle 7 provides a convenient means for carrying the terminal from one application to the next.

Figure 4:
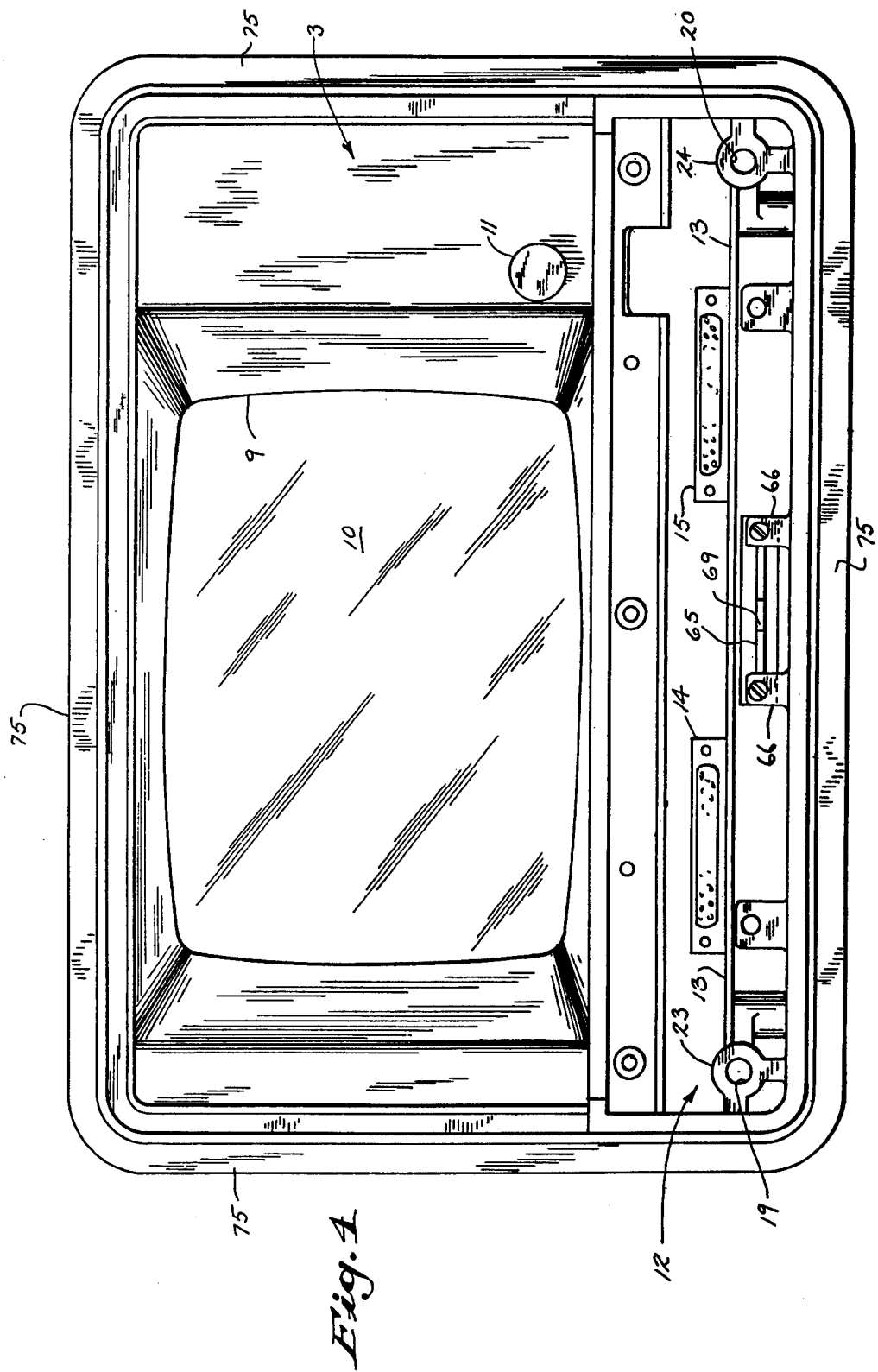
FIG. 4 is a front elevation view of the main unit which forms part of the terminal of FIG. 1.
Figure 5:
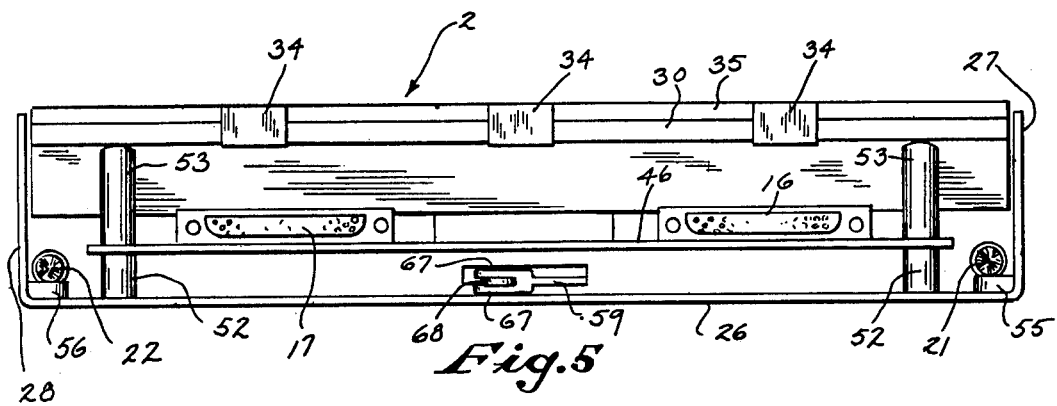
FIG. 5 is a rear elevation view of the application module which forms part of the terminal of FIG. 1.

Referring particularly to FIGS. 3-5, the bezel 3 provides a large rectangular opening 9 in its surface through which a cathode ray tube screen 10 can be viewed. Alongside the opening 9 is a much smaller opening through which the shaft of an intensity control (not shown in the drawings) extends. A knob 11 is attached to this shaft and it can be easily adjusted by the user to control the brightness of the display 10. Below these openings is a large opening 12 which is located along the bottom edge of the bezel 3 and which extends completely across its width. The opening 12 is in the same plane as a main circuit board 13 which is contained within the main unit 1 and which mounts the electronics for the main unit 1. A pair of electrical connectors 14 and 15 fasten to the main circuit board 13 and these face outward through the opening 12 to connect with mating connectors 16 and 17 in the application module 2. All electrical connections between the main unit 1 and the application module 2 are made through the connectors 14–17.

Alignment of the application module 2 within the opening 12 is provided by a pair of circular cylindrical guideways 19 and 20. As shown best in FIGS. 4, 6 and 8, the guideways 19 and 20 are molded as an integral part of the bezel 3 and are located at the lefthand and righthand extremities of the opening 12. The guideways 19 and 20 are aligned along parallel longitudinal axes and they are spaced apart to receive mating guideposts 21 and 22 that are mounted on the application module 2. The molded bosses 23 and 24 which define the guideways 19 and 20 have considerable mass and considerable axial length to not only align the application module 2, but to also provide support for the application module 2 by transmitting bending forces to the frame of the main unit 1. The guideways 19 and 20 may be tapered in the axial direction to ease insertion of the guideposts 21 and 22 and shapes other than circular cylindrical may also be employed with equal success.

As shown best in FIGS. 3 and 5–9, the application module 2 includes a molded plastic housing 25 which is shaped to form a bottom 26, verticle left and right sidewalls 27 and 28, an upturned front wall 29, and a separate top 30. Slots 31 are formed along the front wall 29 to allow the free flow of cooling air to the circuitry inside the module 2 and a cavity 32 is formed in the front wall 29 by a recess which is located at its middle. Three hinge posts 33 are formed along the back edge of the top 30 and these receive three corresponding sets of fingers 34 which are integrally molded to a keyboard retainer frame 35. The frame 35 is rectangular in shape and it has a large window 36 which lays over the top 30 of the module housing 25 when the retainer frame is swung downward into an operating position. A pair of clasps 37 and 38 are formed on the outer edge of the keyboard retainer frame 35 and these snap into slots 39 and 40 formed in the top 30 to hold the frame 35 inplace.

As shown best in FIGS. 3, 7 and 9, the top 30 of the module housing 25 is recessed slightly over its middle portion to receive a flexible membrane keyboard. The keyboard includes a five by fourteen switch matrix 42 and a keyboard overlay 43. The switch matrix 42 includes two ribbons 44 containing conductive leads which connect to the switch matrix 42 and which extend down through openings 45 in the top 30 to make connection with a circuit board 46 mounted within the module housing 25. As shown in FIG. 9, connection is made by a pair of connectors 47 which are soldered directly to the circuit board 46.

Laid loosely on top of the switch matrix 42 is the keyboard overlay 43. The keyboard overlay 43 is comprised of a first sheet of flexible plastic on which symbols for the keyboard are printed and a second sheet of less flexible plastic material which defines the boundaries for each key. It fits within the recess formed in the top 30 and it includes a pair of guide holes 48 which fit snuggly over corresponding guide pins 49. The guide pins 49 extend upward from the top 30 on its lefthand and righthand edges and they serve to align the keyboard overlay 43.

It is one of the advantages of the present invention that the keyboard overlay 43 can be easily changed to provide the user with a variety of keyboard key arrangements and key symbols. Consequently, a particular overlay 43 may define only a few keys which are aligned over a few corresponding switches in the switch matrix 42, whereas another overlay 43 may define a large number of keys. These overlays 43 may be exchanged by swinging the retainer frame 35 upward as shown in FIG. 3, removing one overlay 43 and replacing it with another. The retainer frame 35 is then swung back into its operating position in which the overlay 43 and switch matrix 42 are sandwiched between the retainer frame 35 and the top 30 of the module housing 25.

Referring particularly to FIGS. 5 and 7, the circuit board 46 in the application module 2 is mounted such that it is aligned with the circuit board 13 in the main unit 1 when the application module 2 is fastened in place. The circuit board 46 is supported by four lower posts 52 which extend upward from the housing bottom 26 and four upper posts 53 which extend downward from the housing top 30. Screws (not shown in the drawings) extend upward through the lower posts 52 and through aligned openings in the module circuit board 46 into threaded engagement with the upper posts 53. These screws not only fasten the circuit board 46 in place, but they also fasten the housing top 30 to the remainder of the application module housing. For a detailed description of the electronic circuitry on the circuit board 46, reference is made to the above cited copending application entitled "Industrial Terminal".

Figure 6:
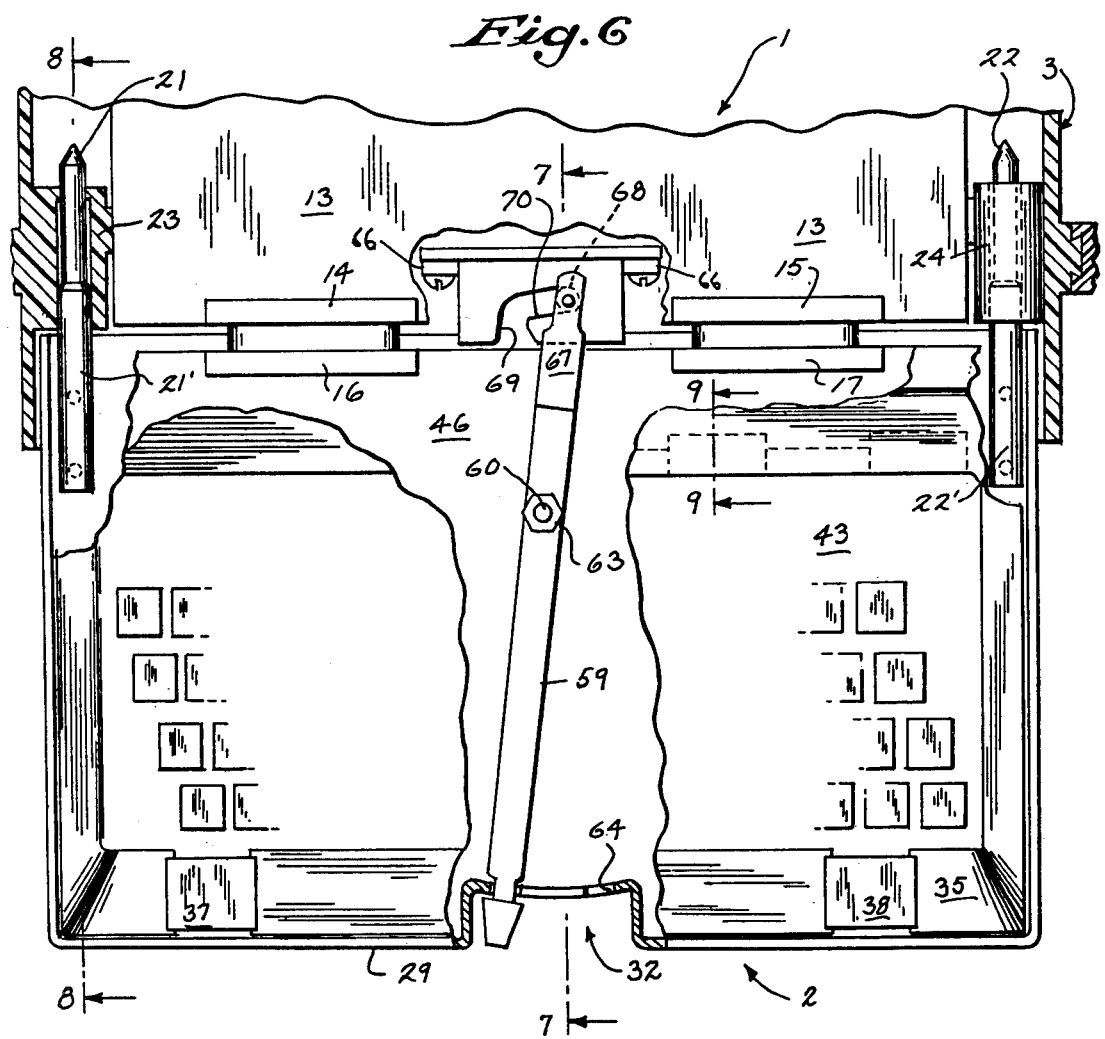
FIG. 6 is a partial top view of the terminal of FIG. 1 with parts cut away to show the connection of the application module to the main unit.

As shown best in FIGS. 5, 6 and 8, the guide-posts 21 and 22 are fastened to bosses 55 and 56 which are integrally molded to the bottom 26 of the module housing 25. The bosses 55 and 56 extend upward from the bottom 26 and provide flat mounting surfaces upon which the guideposts 21 and 22 are fastened. The guideposts 21 and 22 each have a slightly enlarged barrel portion 21' and 22' which is flat along one side and which includes a pair of threaded openings on the flat surface. Screws 57 extend upward through openings in the bosses 55 and 56 and they are received in these threaded openings to tightly fasten the guideposts 21 and 22 in place.

Referring particularly to FIGS. 4–7, the application module 2 is securely retained in its operating position by a fastening mechanism which includes a lever 59. The lever 59 is fastened to the bottom 26 of the application module housing 25. A bolt 60 extends upward through an annular shaped guide 61 and into threaded engagement with a metal pivot bushing 62. The bushing 62 extends through an opening in the lever 59 and it has a cap 63 which holds the lever 59 in place and allows it to pivot about a vertical axis. One end of the lever 59, extends forward through a slot 64 in the housing cavity 32 where it can be manually operated by the user.

The other end of the lever 59 extends into the main unit 1 where it engages a cam plate 65 that is fastened to the bottom of the bezel 3 through a pair of integrally molded posts 66. The operating end of the lever 59 is bifurcated to provide a pair of spaced fingers 67 which support between them a roller 68. As shown best in FIG. 6, when the application module 2 is inserted into the main unit 1, the roller 68 on the operating end of the lever 59 enters the mouth portion 69 of a slot formed in the cam plate 65. At this point the electrical connectors 14–17 are in partial engagement and the guideposts 21 and 22 have properly aligned the application module 2 for complete engagement. The lever 59 is then pivoted in the clockwise direction and the roller 68 rides along a sloped cam portion 70 of the slot in the cam plate 65. A force directed along an axis parallel to the guideposts 21 and 22 is thus produced which draws the application module 2 into complete engagement with the main unit 1. Considerable frictional forces can thus be overcome merely by swinging the lever 59 from one end to the other of the slot 64.

The primary use for the terminal is to program, edit and trouble shoot industrial equipment such as programmable controllers and process controllers. Such equipment may be located in relatively clean and centrally located data processing centers or it may be located at remote locations throughout a manufacturing plant. The terminal of the present invention is compact and relatively lightweight and it includes a handle which further facilitates its use throughout a manufacturing plant. One difficulty which has been encountered in the past with such industrial terminals is that they are not necessarily set down or used in an upright position. Instead, they may be set on their side, or even upside down.

The industrial terminal of the present invention contemplates such use. Referring particularly to FIGS. 1-3 and 10, the terminal includes a pair of elastic bumpers 75 and 76 which each extend completely around the main unit 1. The forward bumper 75 extends around the perimeter of the bezel 3 and the rear bumper 76 extends around the perimeter of the back 4. The forward and rear bumpers 75 and 76 are spaced from one another and follow substantially parallel paths around the periphery of the main unit 1. Both the bezel 3 and back 4 have an integrally molded tenon 77 which extend outward from their surfaces and around their periphery. The tenons 77 engage a mating mortise 78 which is formed on the underside of each bumper 75 and 76. The bumpers 75 and 76 are thus securely retained in position to provide resilient support on the bottom, both sides, and the top of the main unit 1.

Figure 11:
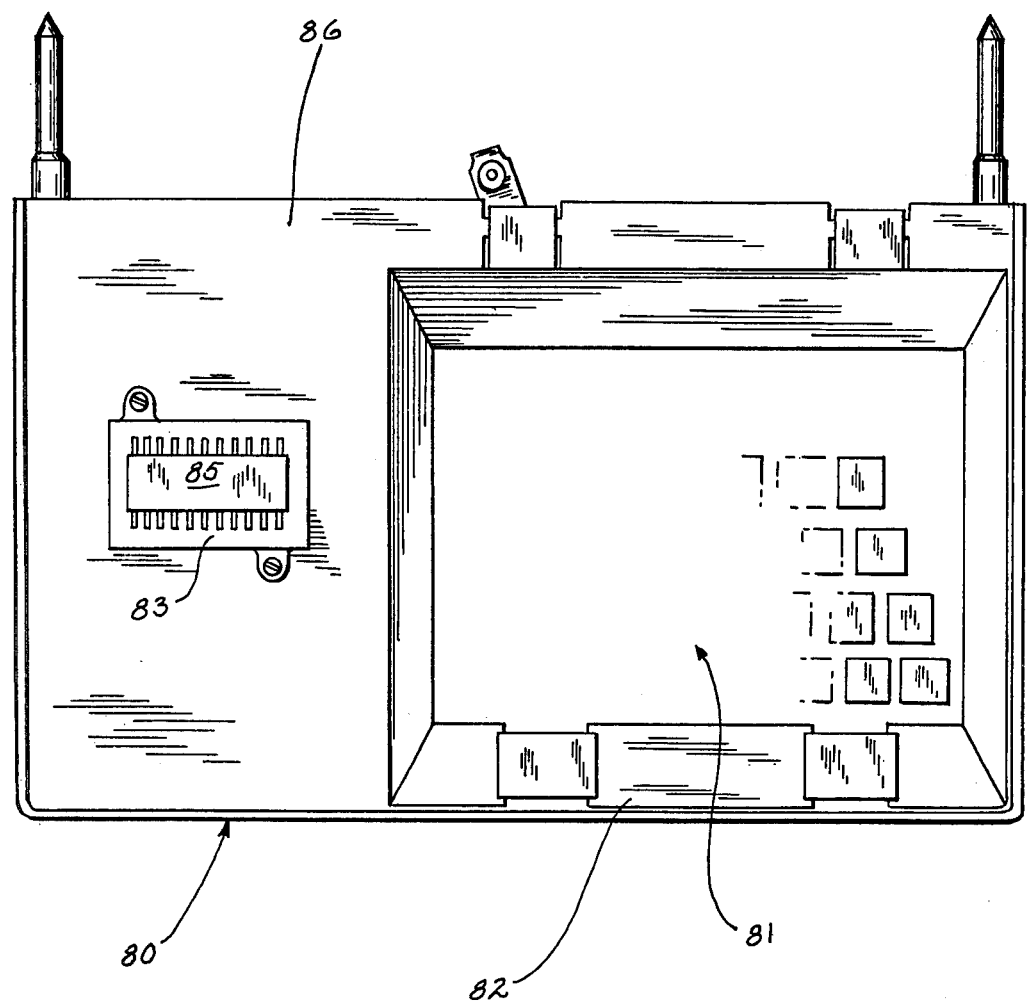
FIG. 11 is a top view of an alternative application module which may be used on the terminal of FIG. 1.

It should be apparent to those skilled in the art that numerous variations can be made from the preferred embodiment of the invention. For example, in FIG. 11 another application module 80 is shown which functions to program read-only memory circuits for use in programmable controllers. The construction of the application module 80 is nearly identical to that described above except the keyboard 81 and retainer frame 82 does not extend across the entire top 86 of the module. Instead, a socket 83 for a twenty-four pin dual-in-line integrated circuit package 85 is mounted to the lefthand side of the top 86. Commands are entered using the keyboard 81 to load a program into the memory circuit 85 plugged into the socket 83 as taught in U.S. Pat. No. 3,798,612, issued on Mar. 19, 1974 and entitled "Controller Programmer". Obviously, the circuitry in the application module 80 differs considerably from that in the application module described above, since its function is to "burn" a program into a memory circuit 85. As with the module 2 described above, however, the keyboard overlay may be changed to alter the key layout or key symbols to meet the requirements of each particular application.

We claim:

1. A terminal for housing electronic circuitry and a cathode ray tube display, the combination comprising;
   a bezel which defines an opening through which the cathode ray tube is viewed and which has an outer periphery that completely encircles said opening;
   back means spaced from the bezel to define a cavity between them in which the cathode ray tube and electronic circuitry are contained, said back means having an outer periphery;
   cover means which extends between the bezel and the back means and which encloses the cavity therebetween;
   a forward bumper formed of a resilient material, said forward bumper being fastened to said bezel and being positioned to extend completely around its periphery; and
   a rear bumper formed of a resilient material, said rear bumper being fastened to said back means and being positioned to extend completely around its periphery,
   wherein the forward and rear bumpers provide resilient support for the terminal which spaces the cover means from a surface upon which the terminal may rest,
   in which the forward bumper is fastened to the bezel by a mortise and tenon joint comprised of a tenon formed around the periphery of the bezel and a mortise formed on the underside of the forward bumper, and in which the rear bumper is fastened to the back means by a mortise and tenon joint comprised of a second tenon formed around the periphery of the back means and a second mortise formed on the underside of the rear bumper.

2. The terminal as recited in claim 1 in which the bezel and back means are formed from molded plastic material and the respective first and second tenons are molded as an integral part of said bezel and back means.

3. The terminal as recited in claim 1 in which said forward and rear bumpers are each a continous loop.

* * * * *